(12) United States Patent
Dong et al.

(10) Patent No.: US 6,709,487 B1
(45) Date of Patent: Mar. 23, 2004

(54) ADSORBENT FOR MOISTURE REMOVAL FROM FLUORINE-CONTAINING FLUIDS

(75) Inventors: Chun Christine Dong, Macungie, PA (US); Madhukar Bhaskara Rao, Fogelsville, PA (US); Dingjun Wu, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/278,131

(22) Filed: Oct. 22, 2002

(51) Int. Cl.⁷ .................. B01D 53/04; B01D 53/28
(52) U.S. Cl. ............... 95/117; 95/126; 95/900; 96/108; 96/153; 423/210
(58) Field of Search .............. 95/117, 121, 126, 95/139, 140, 900; 96/108, 153, 154; 423/210

(56) References Cited

U.S. PATENT DOCUMENTS

| | | | | |
|---|---|---|---|---|
| 3,727,379 A | * | 4/1973 | Bijleveld et al. | 95/137 |
| 3,917,469 A | * | 11/1975 | Cotter et al. | 95/137 |
| 4,156,598 A | * | 5/1979 | Woytek et al. | 423/239.2 |
| 4,578,256 A | * | 3/1986 | Nishino et al. | 423/210 |
| 4,853,148 A | | 8/1989 | Tom et al. | 252/194 |
| 4,925,646 A | | 5/1990 | Tom et al. | 423/488 |
| 4,933,162 A | * | 6/1990 | Vansant et al. | 423/488 |
| 5,094,830 A | * | 3/1992 | Tom et al. | 423/342 |
| 5,248,321 A | * | 9/1993 | Yang | 95/98 |
| 5,589,148 A | | 12/1996 | Otsuka et al. | 423/240 |
| 6,033,460 A | | 3/2000 | Snow | 95/117 |
| 6,042,796 A | * | 3/2000 | Snow | 423/210 |
| 6,059,859 A | * | 5/2000 | Alvarez et al. | 95/117 |
| 6,077,487 A | * | 6/2000 | Snow | 423/210 |
| 6,110,258 A | | 8/2000 | Fraenkel et al. | 95/117 |
| 6,221,132 B1 | * | 4/2001 | Dong et al. | 95/117 |
| 6,491,740 B1 | * | 12/2002 | Wang et al. | 95/90 |

FOREIGN PATENT DOCUMENTS

| | | |
|---|---|---|
| EP | 0299488 A2 * | 1/1989 |
| EP | 0501933 | 9/1992 |

\* cited by examiner

*Primary Examiner*—Robert H. Spitzer
(74) *Attorney, Agent, or Firm*—R. P. Morris-Oskanian

(57) ABSTRACT

An adsorbent, method, and apparatus involving same for the removal of moisture from a fluoride-containing fluid such as gaseous nitrogen trifluoride are disclosed herein. In certain preferred embodiments, the adsorbent of the present invention comprises an organic support having a porosity of 30% or greater and a pore size of 2 $\mu$m or less; and at least one metal fluoride disposed within at least a portion of the organic substrate.

30 Claims, 3 Drawing Sheets

ADSORBENT FOR MOISTURE REMOVAL FROM FLUORINE-CONTAINING FLUIDS

BACKGROUND OF THE INVENTION

The present invention relates generally to the removal of impurities contained in fluidic streams. More specifically, the invention relates to an adsorbent, and apparatus comprising same, for the removal of water from a fluorine-containing fluid such as nitrogen trifluoride and methods for making and using same.

In numerous industrial and commercial processes, it may be desirable to provide fluorine-containing fluids such as nitrogen trifluoride ($NF_3$) as high purity, anhydrous materials. One area in which high purity nitrogen trifluoride is required in essentially water-free form is in semiconductor manufacturing operations. For example, gaseous nitrogen trifluoride may be used in the plasma etching of wafers. It may also be used as a cleaning gas in chemical vapor deposition (CVD) chambers following oxide deposition. One difficulty in preparing fluorine-containing fluids such as nitrogen trifluoride is that it can form strong hydrogen bonds with water molecules. Because of this, water contamination of nitrogen trifluoride or other fluorine-containing gases may be common.

Water needs to be removed from nitrogen trifluoride because trace amounts of water can significantly reduce the etching rate and thereby increase the consumption of nitrogen trifluoride. Water removal from nitrogen trifluoride and other fluorine-containing gases, however, is difficult because these gases are relatively strong oxidizers and may react with traditionally-used water scavengers at typical purification conditions, i.e., ambient temperature and pressures up to 1450 psig for nitrogen trifluoride. Accordingly, there is a need for a strong yet stable getter or adsorbent for water removal from nitrogen trifluoride and other fluorine-containing gases.

One method used to remove water from nitrogen trifluoride and other fluorine-containing gases is employing moisture-sorptive molecular sieves. In this connection, molecular sieves may be used as a drying agent for dilute nitrogen trifluoride, i.e., up to 50%, at ambient temperature and slightly above ambient pressure (e.g., 5 to 10 psig). However, nitrogen trifluoride can react with sites on the molecular sieves at higher pressures and/or high concentrations thereby generating volatile impurities. This reaction may lead to the breakdown of the sieve substrate. As a result, molecular sieves may not be practical for drying nitrogen trifluoride in semiconductor manufacturing applications such as point-of-use purifiers or built-in purifiers wherein the partial pressure of nitrogen trifluoride is normally as high as 1450 psig (e.g., cylinder pressure at 20° C.).

European Patent Application 0501933 describes an activated zirconium, vanadium, and iron alloy that is used to remove water or oxygen impurities from a noncorrosive, fluorine-containing gas such as $CF_4$, $CHF_3$, $CF_2Cl_2$, $C_2F_6$, and $SF_6$. The zirconium, vanadium and iron alloy is activated by heating the alloy to a temperature of greater than 300° C. The activated zirconium, vanadium and iron alloy operates at an elevated temperature between 100° C. and 150° C. This elevated temperature range allows the alloy to be active towards the water and oxygen impurities within the fluorine-containing gas. One drawback to this approach, however, is that power and additional capital equipment are needed to maintain the fluorine-containing gas at the elevated temperature. Further, the zirconium, vanadium and iron alloy may be unstable in certain corrosive fluorine-containing gases such as nitrogen trifluoride.

U.S. Pat. No. 5,589,148 describes a process for removing water and a hydrogen halide such as hydrogen bromide, hydrogen chloride, or hydrogen fluoride from a halogen-containing gas stream using a purifying agent consisting of a mixture of an alkaline-earth hydroxide and iron oxide. The purifying agent is prepared by mixing the alkaline-earth hydroxide such as strontium hydroxide with iron oxide at an atomic ratio of alkaline earth to iron of 15:1 to 1:12. The iron oxide can consist of tri-iron tetraoxide, iron(II) oxide, iron (II) hydroxide, iron (II) oxide and iron (III) hydroxide. The alkaline-earth hydroxide and the iron oxide are bound together using a polymeric binding agent. A major concern of using this approach for drying nitrogen trifluoride gas is that the purifying agent may react with nitrogen trifluoride which may degrade the purifying agent as well as introduce volatile by-products. As mentioned earlier, volatile by-products are undesirable contaminants in the aforementioned semiconductor manufacturing applications.

U.S. Pat. No. 6,033,460 describes a process and composition for removing moisture from a nitrogen trifluoride or fluoride gas by using an adsorbent consisting of alumina particles coated with aluminum trifluoride ($AlF_3$). The $AlF_3$ coating is formed by reacting alumina particles with an aqueous solution of hydrogen fluoride. This coating may crack thereby exposing the underlying alumina to nitrogen trifluoride. One potential drawback to the '460 adsorbent is that alumina is highly reactive to nitrogen trifluoride which could undermine the effectiveness of the adsorbent as a water scavenger as well generate gaseous by-products that can contaminate the $NF_3$. A further drawback is that the surface area of the '460 adsorbent may be reduced due to the volume expansion from the conversion of $Al_2O_3$ to $AlF_3$. Since $AlF_3$ is stoichiometrically less dense than $Al_2O_3$, the volume expansion at the surface of the alumina particles may block the open pores of the adsorbent thereby lowering the capacity for water.

U.S. Pat. No. 6,110,258 discloses a method for removing trace moisture from a gas such as nitrogen trifluoride using a zeolite adsorbent having a silica-to-alumina ratio above 10. The zeolite is heated to a temperature above 650° C. prior to contacting the zeolite adsorbent with the gas.

Accordingly, there is a need in the art for an adsorbent for water in nitrogen trifluoride or other fluorine-containing fluid that does not react with the fluid itself which may generate undesirable contaminants. There is a need in the art to provide a adsorbent for water in nitrogen trifluoride or other fluorine-containing fluid that does not require operation at temperatures greater than ambient. Further, there is a need in the art for a commercially viable adsorbent that does not require high activation temperatures.

All references cited herein are incorporated herein by reference in their entirety.

BRIEF SUMMARY OF THE INVENTION

The present invention fulfills some, if not all, of the needs in the art by providing adsorbents for removal of water from a fluorine-containing fluid such as nitrogen trifluoride. The present invention is directed to, in part, an adsorbent comprising an organic substrate having a porosity of 30% or greater and a pore size of 2 μm or less and a metal fluoride disposed within at least a portion of the substrate. In certain preferred embodiments, the metal fluoride is at least one metal fluoride from the group consisting of $CsF$, $CuF_2$, $KPF_6$, $AlF_3$, $CaF_2$, $FeF_2$, $ZrF_2$, $SbF_3$, $LiPF_6$, $NaPF_6$, $K_2NbF_7$, or combinations thereof.

In a further aspect of the present invention, there is provided an adsorbent for the removal of water from a fluorine-containing fluid. The adsorbent comprises a fluorine-containing organic substrate comprising a porosity of 30% or greater; and a metal fluoride disposed within at least a portion of the organic substrate wherein the metal fluoride is at least one selected from the group consisting of $CsF$, $CuF_2$, $KPF_6$, $AlF_3$, $CaF_2$, $FeF_2$, $ZrF_2$, $SbF_3$, $LiPF_6$, $NaPF_6$, $K_2NbF_7$, or combinations thereof. In certain preferred embodiments, the organic substrate comprises polytetrafluoroethylene.

In yet a further aspect of the present invention, there is disclosed a method for preparing an adsorbent for removing water from a fluorine-containing fluid. This method comprises: providing a fluorine-containing organic substrate comprising a porosity of 30% or greater; combining the organic substrate with a certain quantity of at least one metal fluoride sufficient to dispose at least a portion of the metal fluoride into the organic substrate to form an adsorbent precursor; and heating the adsorbent precursor to a temperature of at least 100° C. or greater to form the adsorbent. In certain preferred embodiments, the heating step is conducted at one or more temperatures that range from 100° C. to 230° C.

In a still further aspect of the present invention, there is disclosed a method for reducing the amount of water in a fluid comprising fluorine by passing the fluid over an adsorbent at temperatures ranging from about −30° to about 50° C. wherein the adsorbent comprises a fluorine-containing organic substrate comprising a porosity of 30% or greater and at least one metal fluoride disposed within at least a portion of the organic substrate.

In yet another aspect of the present invention, there is disclosed a method for removing water from a gas comprising fluorine that comprises contacting the gas with an adsorbent comprising a binderless metal fluoride wherein the adsorbent has been heated prior to contacting it with said gas to one or more temperatures of at least 100° C. or greater.

These and other aspects of the invention will become apparent from the following detailed description.

DETAILED DESCRIPTION OF THE INVENTION

Figure 1:
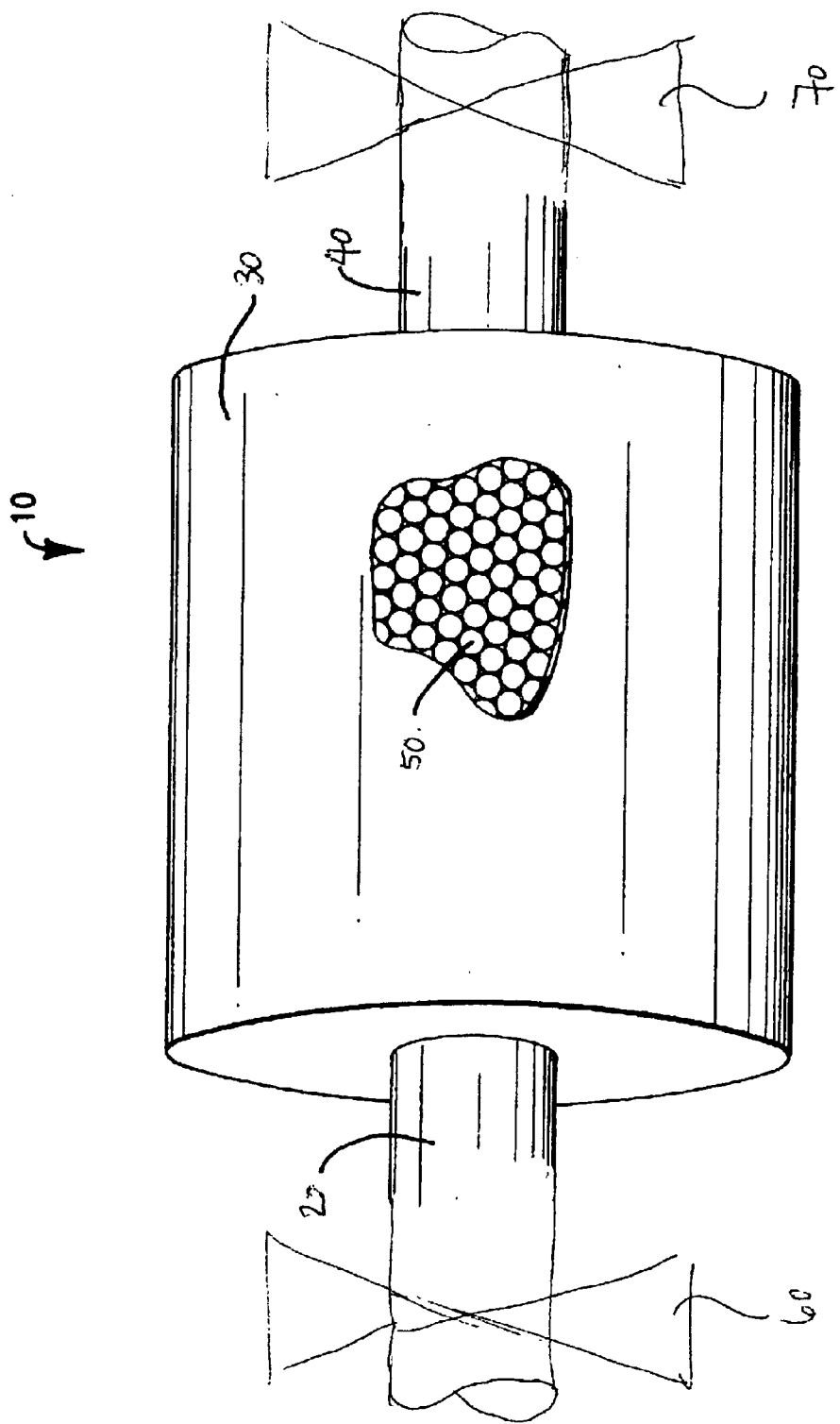
FIG. 1 provides an example of an apparatus that contains one embodiment of the adsorbent of the present invention.

The present invention is directed to an adsorbent for the removal of moisture from a fluorine-containing fluid such as nitrogen trifluoride and a method and apparatus comprising same. The adsorbent on the present invention may reduce the amount of water from the fluorine-containing fluid to 0.1 parts per million (ppm) or less. It is envisioned that the adsorbents of the present invention can be used, for example, in point-of-use purifiers, as built-in purifiers within gas-dispensing cylinders, or as an in-line purifier during the manufacture of the fluorine-containing fluid. The adsorbent of the present invention, and methods and apparatus comprising same, may be stable, or are substantially non-reactive, in the fluorine-containing fluid. In addition, the adsorbent may be hygroscopic within a fluorine-containing fluid such as nitrogen trifluoride gas. Further, the adsorbent of the present invention can be readily manufactured into a structure with large porosity and relatively high surface area at a comparatively low cost. Moreover, the adsorbent of the present invention, unlike other adsorbents in the prior art, can be operated at ambient temperatures and pressures without introducing impurities into the process stream or destroying the fluorine-containing fluid.

The term "ambient temperature", as used herein, relates to one or more temperatures that range from −30° C. to 50° C.

The term "adsorption" or "adsorb", as used herein, relates to a process, which may be reversible, whereby certain components of a mixture adhere to the surface of solid bodies that it contacts.

The adsorbents of the present invention are preferably used to remove water from a fluid comprising fluorine. The term "fluid" as used herein relates to a flowing fluid composed of a gas, liquid, suspended solids, or combinations thereof. Examples of fluorine-containing fluids include $BF_3$, $SiF_4$, $WF_6$, $HF$, $SF_6$, $CF_4$, $NF_3$, and $F_2$. In certain preferred embodiments, the fluorine-containing fluid comprises gaseous nitrogen trifluoride. In some embodiments of the present invention, the fluid may further comprise other fluids besides, or in addition to, the fluorine-containing fluid. Some examples of these fluids include, but are not limited to, inert gases, nitrogen gas, and/or mixtures thereof.

The adsorbent of the present invention uses one or more metal fluorides as the active scavenging moiety to remove water from the fluorine-containing fluid. The metal fluoride is preferably a compound of the formula $M_{1x}M_{2y}F_z$ wherein $M_1$ and $M_2$ are at least one metal from the group consisting of Ba, Cs, Cu, K, P, Al, Ca, Fe, Mg, Sr, Zr, Sb, Li, Na, and Nb or combinations thereof; x is a number ranging from 1 to 2; y is a number ranging from 0 to 1; and z is a number ranging from 1 to 7. In certain preferred embodiments, the metal fluoride is at least one metal fluoride from the group consisting of $CsF$, $CuF_2$, $KPF_6$, $AlF_3$, $CaF_2$, $FeF_2$, $ZrF_2$, $SbF_3$, $LiPF_6$, $NaPF_6$, $K_2NbF_7$, $BaF_2$, $MgF_2$, $SrF_2$, and $KF$ or combinations thereof.

The metal fluoride may comprise the adsorbent itself or may be disposed within at least a portion of an organic substrate. In embodiments where the metal fluoride comprises the adsorbent itself, one or more metal fluorides are combined with an organic binder to form a mixture. The mixture is fashioned into a powder, granule, bead, pellet, solid support, or other form. The mixture can then be heated to one or more temperatures to decompose the organic binder and activate the metal fluoride thereby forming the binderless metal fluoride adsorbent.

The binderless metal fluoride adsorbent of the present invention has a plurality of pores and a relatively high specific surface area. The decomposition of the organic binder thereby forms voids or pores within the metal fluoride providing a porosity of 30% by volume or greater, preferably 40% by volume or greater, and more preferably 50% by volume or greater. The average pore size within the binderless metal fluoride is 2 μm or less, preferably from 0.001 μm to 1 μm, and more preferably 0.001 μm to 0.1 μm. The surface area ranges from 100 to 2,500 $m^2/g$, preferably 100 to 1,500 $m^2/g$, and more preferably 100 to 1,200 $m^2/g$ measured by BET analysis.

In certain other embodiments of the present invention, the adsorbent of the present invention is comprised of at least one metal fluoride disposed within at least a portion of an organic substrate. Preferably, the organic substrate comprises a material that is stable in the fluid to be purified such as, for example, a fluorine-containing substrate to avoid releasing undesirable by-products into the purified fluid. The term "fluorine-containing substrate" as used herein refers to those chemical compounds having at least one fluorine atom contained therein. In embodiments where the fluorine-containing substrate is a polymer, one or more fluorine atoms may be in the polymeric backbone and/or pendant group(s) attached to the polymeric backbone. In certain preferred embodiments, the substrate comprises polytetrafluoroethylene such as the family of Teflon® products manufactured by DuPont, Inc. of Wilmington, Del.

The organic substrate suitable for the adsorbent of the present invention has a plurality of pores and a relatively high specific surface area. The average pore size within the substrate is 2 µm or less, preferably from 0.001 µm to 1 µm, and more preferably 0.001 µm to 0.1 µm. The surface area of the substrate ranges from 100 to 2,500 m$^2$/g, preferably 100 to 1,500 m$^2$/g, and more preferably 100 to 1,200 m$^2$/g measured by BET analysis. The porosity of the organic substrate is 30% by volume or greater, preferably 40% by volume or greater, and more preferably 50% by volume or greater.

The organic substrate may have a variety of shapes depending upon the application. In certain embodiments, the organic substrate may be granular. In these embodiments, the granules may have a diameter of 5 mm or less. In yet other embodiments, the organic substrate may be other shapes such as, but not limited to, a solid support, beads, or pellets.

The organic substrate of the present invention is preferably thermally stable at temperatures at which the adsorbent is used to maintain the structure of the support. Depending upon the organic substrate selected, the substrate is thermally stable at temperatures that range from ambient temperature to just below the melting point of the organic substrate or below 250° C.

In the certain embodiments of the present invention, one or more metal fluorides may be disposed within at least a portion of the substrate. The metal fluoride may be disposed within the substrate in the form of particulates or agglomerates within the substrate, as a film or plating deposited upon or within on the substrate, or localized within the pores of the substrate. The weight percentage of compound disposed within the substrate can range from 1 to 30%, or more preferably from 1 to 20%.

The metal fluoride may be disposed within the organic substrate in a variety of different ways. In certain embodiments, the adsorbent is made by exposing an organic substrate to a mixture containing at least one metal fluoride. In these embodiments, the mixture may optionally contain one or more surfactants to enhance the wetting of the organic substrate with the metal fluoride. The surfactant may be added, for example, to change the character of the substrate surface from a hydrophobic surface to a substantially more hydrophilic surface. Suitable surfactants for use in the mixture include, but are not limited to, octyl and nonyl phenol ethoxylates such as TRITON® X-114, X-102, X-45, X-15; alcohol ethoxylates such as BRIJ® 56 ($C_{16}H_{33}$(OCH$_2$CH$_2$)$_{10}$OH) (ICI), BRIJ® 58 ($C_{16}H_{33}$(OCH$_2$CH$_2$)$_{20}$OH) (ICI), and acetylenics diols such as SURFYNOLS® 465 and 485 (Air Products and Chemicals, Inc.).

Further surfactants include those surfactants provided in the reference *McCutcheon's Emulsifiers and Detergents*, North American Edition for the Year 2000 published by Manufacturers Confectioners Publishing Co. of Glen Rock, N.J.

In yet other embodiments of the present invention, the mixture may also include a solvent. In embodiments where a solvent is used, the solvent selected will preferably not react with the substrate. Further, the solvent selected is one that can at least partially solubilize the metal fluoride within the mixture. Suitable solvents include, but are not limited to, water, hydrocarbons, saturated or unsaturated halocarbons, ethers, nitrites, or aromatic compounds. The temperature for dissolution of the metal fluoride within the mixture will vary depending upon the boiling point of the solvent. In this connection, the concentration of the metal fluoride within the mixture needs to be controlled to below its solubility limit at the applied dissolution temperature.

The mixture comprising the at least one metal fluoride may be impregnated into at least a portion of the porous organic substrate to form the adsorbent precursor. This step is preferably performed at one or more temperatures ranging from ambient temperature to slightly below the melting point of the substrate. The impregnation step can be performed in a variety of different methods including, but not limited to, soaking the organic substrate material into the mixture, the incipient wetness method, physical mixing or communiation, or vacuum impregnation. The method selected is dependent upon various factors such as the degree of saturation of the mixture, the viscosity of the mixture, whether the mixture is dry or liquid, the selection of substrate, and the affinity between the mixture and the porous substrate. In embodiments where the solvent does not wet the substrate, the vacuum impregnation method can be used. In the incipient wetness method, the volume of the mixture that is poured over the substrate material is sufficient to fill the pores of the substrate without the existence of a standing mixture. In other words, the amount of mixture used is roughly equivalent to the the pore volume of the substrate material to be impregnated. In the physical mixing method, the organic substrate may be physically processed by communiation or grinding to a certain size and then combined with the mixture containing the metal fluoride. The combining of the mixture and the organic substrate may occur at ambient temperatures or at one or more temperatures greater than ambient, or slightly below the melting point of the substrate, to enhance the dissolution of the mixture within the organic substrate.

After the combining step is completed, any excess mixture containing at least one metal fluoride may be separated from the organic substrate by sieving, extraction, or other means.

In other embodiments of the present invention, the adsorbent is formed via a thermal deposition method. This method may be suitable for embodiments where the compound is insoluble in water or other solvents. In these embodiments, a compound precursor, such as an organometallic precursor, that contains at least one of the same metal cations as the cation within the metal fluoride is deposited onto at least a portion of the porous organic substrate. The substrate containing the compound precursor is heated to one or more temperatures of at least 100° C. or greater in an atmosphere in a fluorine gas atmosphere. The metal fluoride is formed on at least a portion of the substrate from the reaction of the at least one metal cation from the compound precursor and the fluorine gas.

In certain embodiments of the present invention, the impregnated substrate or adsorbent precursor may be dried. For example, the adsorbent precursor is dried to remove the excess solvent in embodiments where a solvent is added to the mixture. The drying step may be performed at room temperature and ambient atmosphere to create open channels within the substrate. Alternatively, the drying step may be done using vacuum to increase the rate and the efficiency of the drying process. In a further embodiment of the present invention, the drying step may be incorporated into the activation or heating step by heating to one or more temperatures prior to reaching the activation temperature of the adsorbent. For example, the drying step may be performed as a gradual ramp or increase in temperature prior to reaching the activation temperature or may be a controlled soak at one or more temperatures below the activation temperature.

In the activation step, the adsorbent precursor is heated to one or more of 100° C. or greater. Preferably, the heating step is conducted to one or more temperatures that range from between 100° C. to 230° C., depending upon the melting point of the organic substrate. The activation temperature of the adsorbent precursor can be determined by thermal gravimetric analysis (TGA) or other means. The heating may be performed under vacuum or within an inert or a nitrogen atmosphere. The atmosphere for the activation step may vary depending upon the composition of the metal fluoride and/or the organic substrate.

The adsorbent of the present invention is typically used within a purification apparatus. FIG. 1 provides an example of one embodiment of the purification apparatus 10 comprising the adsorbent of the present invention. Apparatus 10 consists of a fluid inlet 20, a chamber 30, and a fluid outlet 40. Chamber 30 contains an adsorbent 50 that may be in the form of particles, pellets, rods, morsels, honeycomb, discs, blocks, saddles, granules or a variety of other shapes depending upon the use. Adsorbent 50 may consist of at least one metal fluoride that is disposed within at least a portion of the organic substrate as described herein. Alternatively, adsorbent 50 may consist of one or more binderless metal fluorides. Apparatus 10 further has inlet valve 60 and outlet valve 70 that are in fluid communication with fluid inlet 10 and fluid outlet 40. Inlet valve 60 and outlet valve 70 are used to regulate the flow of fluid that is passed through apparatus 10. In certain preferred embodiments, the inlet and outlet valves 60 and 70 may be connected to a central processing unit that can control the operation of both valves. For example, valves 60 and 70 may open and close in sequence or out of sequence to create a full fluid flow, pulsed fluid flow, or variations in-between.

The adsorbent of the present invention is believed to react with the water within the fluorine-containing fluid to form a hydrated metal fluoride, i.e., $M_{1x}M_{2y}F_z \cdot nH_2O$, at ambient temperature. The adsorbent may be regenerated or reused because the hydrated metal fluoride can be dissociated at an elevated temperature such as the activation temperature of the adsorbent. The adsorbent of the present invention reduces the amount of water within the incoming fluid stream to 10 ppm or below, preferably 1 ppm or below, and more preferably 0.1 ppm or below.

The invention will be illustrated in more detail with reference to the following examples, but it should be understood that the present invention is not deemed to be limited thereto.

EXAMPLES

Comparative Example

Exposure of Dehydrated, Porous Alumina to Nitrogen Trifluoride Gas Stream

A 76.06 mg sample of HF-200 alumina ($Al_2O_3$) manufactured by Alcoa of Pittsburgh, Pa. was heated to a temperature of 200° C. in a nitrogen atmosphere to remove any residual water within the sample. The sample was then loaded into a TA 2050 thermogravimetric analyzer manufactured by TA Instrument of New Castle, Del. and cooled to a temperature of 50° C. to prevent the uptake of water into the dehydrated sample. A stream of nitrogen was flowed over the sample for the first approximately 10 minutes of the run. A mixed gas stream of 50/50 nitrogen trifluoride and nitrogen was then flowed over the sample. The weight of the sample was monitored with respect to time and percent weight change and the result of this analysis is provided in FIG. 2.

Figure 2:
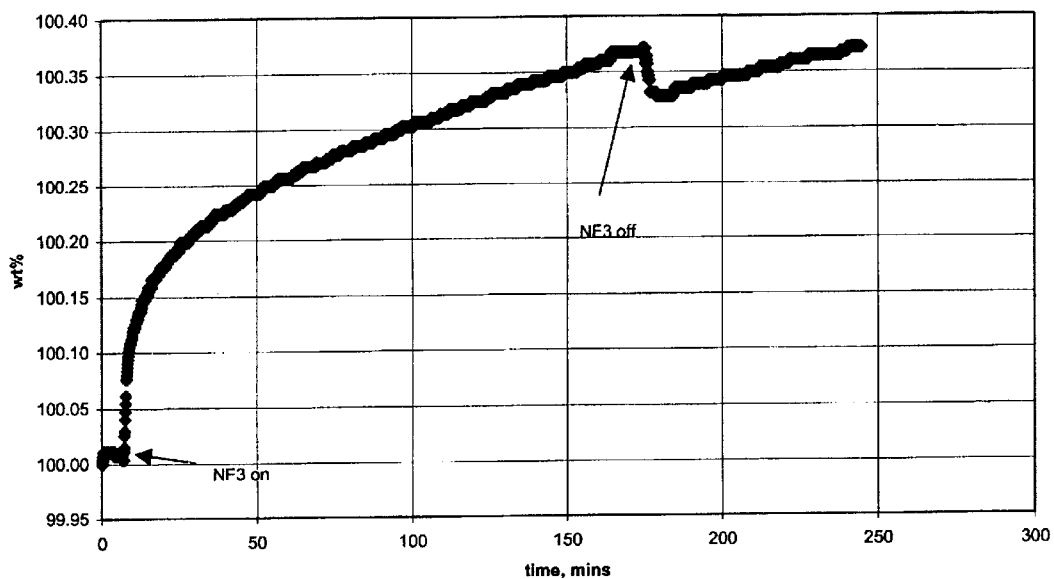
FIG. 2 provides the weight percentage versus time graph that illustrates the reactivity of a dehydrated, porous alumina to a $NF_3$ gas mixture.

As FIG. 2 illustrates, as soon as the mixed gas stream is initiated, the weight of the sample increases dramatically and continues to increase with time. It is believed that the weight increase of the alumina sample is a result of the formation of aluminum trifluoride ($AlF_3$) by the reaction of nitrogen trifluoride with alumina. These results indicate that alumina dehydrated to a temperature of 200° C. is extremely reactive to nitrogen trifluoride. Further, the reaction of alumina to nitrogen trifluoride may generate gaseous by-products such as $AlF_3$, $N_2O$, and $OF_2$ that can contaminate nitrogen trifluoride. Additionally, some of these gaseous by-products are highly toxic and may create disposal issues.

Example 1

Cesium Fluoride and Teflon® Adsorbent

An approximately 20 gram quantity of 70% porosity polytetrafluoroethylene (PTFE) manufactured by W. R. Grace Co. of Columbia, Md. was comminuted to irregular-shaped granules having a diameter which ranges from approximately 2 mm to approximately 3 mm. The weight of the PTFE granules was measured and then loaded into a glass beaker. A 10 gram quantity of CsF dry powder was charged into the glass beaker and mixed with the PTFE granules. The top of the beaker was covered and placed into a pre-heated oven at a temperature of 200° C. The beaker was heated at this temperature for about 72 hours. The beaker was then removed from the oven and cooled to ambient temperature. The excess CsF powder was separated from the PTFE granules to provide the adsorbent via extraction. The weight of the CsF and PTFE granular adsorbent was measured. The weight percentage of loading of the CsF within the PTFE granules was approximately 10%.

Example 2

Water Capacity of Hydrated Cesium Fluoride Sample

A 85.7301 mg sample of dry cesium fluoride powder was placed on the pan of a TA 2050 thennogravimetric analyzer manufactured by TA Instrument of New Castle, Del. A quantity of 17 weight percent of water relative to the amount of cesium fluoride was added to the sample. The sample was first heated to 110° C. at a rate of 10° C./min and held for about 120 minutes. The sample was then heated to 500° C. at a rate of 5° C./min and then cooled to ambient temperature. Both heating steps were conducted in a nitrogen atmosphere.

Figure 3:
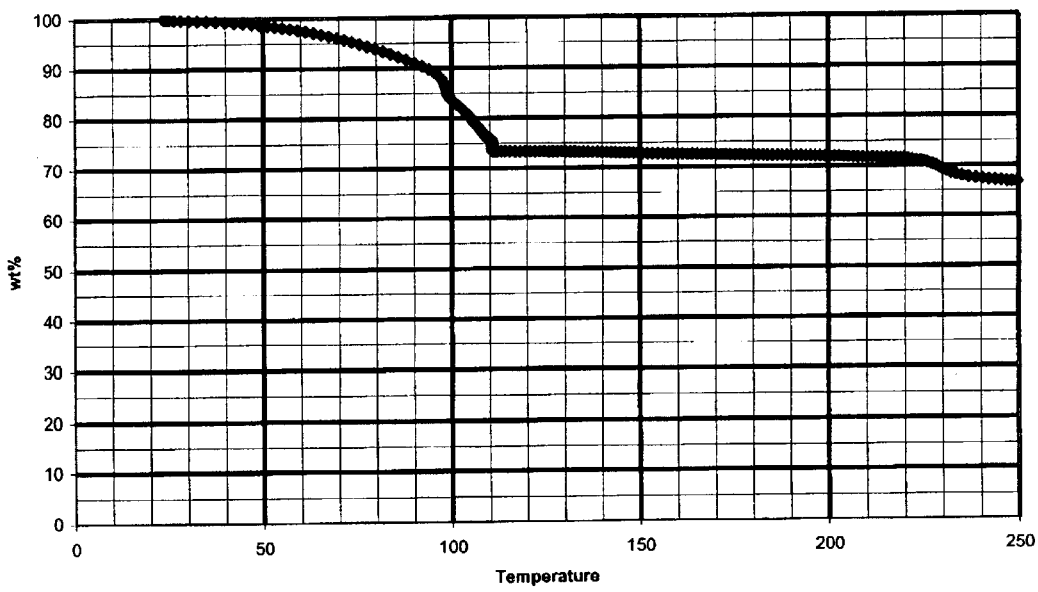
FIG. 3 provides the weight percentage loss versus temperature graph of a CsF sample.

FIG. 3 provides a graph of the percent weight loss for the hydrated cesium fluoride sample versus temperature. FIG. 3 shows that the hydrated cesium fluoride sample loses approximately 26.6 weight % of water upon heating to a temperature of 110° C. It is believed that this weight loss is associated with the loss of loosely bound water on the hydrated cesium fluoride sample. Referring again to FIG. 3, the sample loses approximately 4.5 weight % of water between the temperature range of 110° C. to 230° C. The decomposition temperature of polytetrafluoroethylene is approximately 230° C. This establishes that an adsorbent comprising cesium fluoride, such as a polytetrafuorethylene substrate having cesium fluoride disposed therein or a binderless cesium fluoride, may be activated at a temperature below 230° C. and may adsorb up to 0.045 grams of water from each gram of CsF disposed therein.

Example 3

Water Isotherm of Hydrated Cesium Fluoride Sample

The water isotherm of a cesium fluoride sample was measured by a Cahn Model 100 gravimetric microbalance system provided by Thermo Orion of Beverly, Mass. A 46.859 mg sample of dehydrated cesium fluoride was heated to a temperature of about 350° C. under a continuous flow of helium for a time of 12 hours. The sample was then placed within the gravimetric microbalance system. A helium flow having a desired water level was passed through the cesium fluoride sample until equilibrium was reached or about 40 hours.

Figure 4:
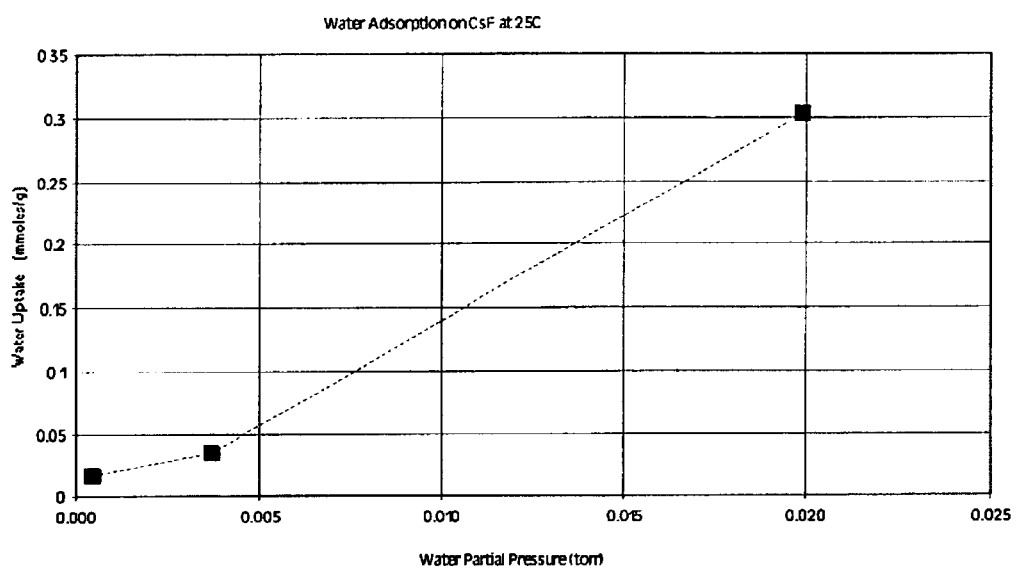
FIG. 4 provides the water uptake expressed in mmoles/g versus water partial pressure in torr on a CsF sample at 25° C.

FIG. 4 shows the water capacity in mmoles/gram for the cesium fluoride sample at a variety of different water partial pressures measured in torr. For example, at a water partial pressure of 0.0199 torr, the equivalent to 263 ppb water level in a $NF_3$ cylinder with a total pressure of 1450 psig, the water capacity on the cesium fluoride sample is 0.303 mmole/g. Consequently, an adsorbent containing CsF may adsorb up to approximately 0.05 grams of water for each gram of CsF disposed therein.

While the invention has been described in detail and with reference to specific examples thereof, it will be apparent to one skilled in the art that various changes and modifications can be made therein without departing from the spirit and scope thereof.

We claim:

1. A method for reducing the amount of water in a fluid comprising fluorine by passing the fluid over an adsorbent at temperatures ranging from −30° to 50° C. wherein the adsorbent comprises a fluorine-containing organic substrate comprising a porosity of 30% or greater and at least one metal fluoride disposed within at least a portion of the organic substrate.

2. The method of claim 1 wherein the amount of water is reduced to 0.1 ppm or below.

3. The method of claim 1 wherein the fluid comprises $NF_3$.

4. The method of claim 3 wherein the water within the $NF_3$ is at a partial pressure of 0.1 atm or less.

5. A method for removing water from a gas comprising fluorine, the method comprising contacting the gas with an adsorbent comprising a binderless metal fluoride wherein the adsorbent has been heated prior to contacting it with said gas to one or more temperatures of at least 100° C. or greater.

6. The method of claim 5 wherein the adsorbent has a porosity of 30% or greater.

7. The method of claim 5 wherein the adsorbent has a pore size that ranges from 0.001 to 1 $\mu$m.

8. The method of claim 7 wherein the adsorbent has a pore size that ranges from 0.001 to 0.1 $\mu$m.

9. An adsorbent for the removal of water from a fluorine-containing gas, the adsorbent comprising:

an organic substrate comprising a porosity of 30% or greater and a pore size of 2 $\mu$m or less; and at least one metal fluoride disposed within at least a portion of the organic substrate.

10. The adsorbent of claim 9 wherein the at least one metal fluoride is a compound of the formula $M_{1x}M_{2y}F_2$ wherein $M_1$ and $M_2$ are one selected from the group consisting of Ba, Cs, Cu, K, P, Al, Ca, Fe, Mg, Sr, Zr, Sb, Li, Na, and Nb or combinations thereof; x is a number ranging from 1 to 2; y is a number ranging from 0 to 1; and z is a number ranging from 1 to 7.

11. The adsorbent of claim 9 wherein the metal fluoride is selected from the group consisting of CsF, $CuF_2$, $KPF_6$, $AlF_3$, $CaF_2$, $FeF_2$, $ZrF_2$, $SbF_3$, $LiPF_6$, $NaPF_6$, $K_2NbF_7$, or combinations thereof.

12. The adsorbent of claim 9 wherein the organic substrate comprises a polymer.

13. The adsorbent of claim 12 wherein the polymer comprises fluorine.

14. The adsorbent of claim 13 wherein the polymer comprises polytetrafluoroethylene.

15. The adsorbent of claim 9 wherein the adsorbent is activated at one or more temperatures that range from 100° C. to 230° C.

16. The adsorbent of claim 9 wherein the weight percentage of metal fluoride disposed within the substrate ranges from 1 to 30%.

17. The adsorbent of claim 16 wherein the weight percentage of metal fluoride disposed within the substrate ranges from 1 to 20%.

18. An apparatus for removing water from said fluorine-containing gas, the apparatus comprising the adsorbent of claim 9.

19. An adsorbent for the removal of water from a fluorine-containing gas, the adsorbent comprising:

a fluorine-containing organic substrate comprising a porosity of 30% or greater; and at least one metal fluoride disposed within at least a portion of the organic substrate wherein the metal fluoride is one selected from the group consisting of CsF, $CuF_2$, $KPF_6$, $AlF_3$, $CaF_2$, $FeF_2$, $ZrF_2$, $SbF_3$, $LiPF_6$, $NaPF_6$, $K_2NbF_7$, or combinations thereof.

20. A method for preparing an adsorbent for removing water from a fluorine-containing gas, the method comprising:

providing a fluorine-containing organic substrate comprising a porosity of 30% or greater;

combining the organic substrate with a certain quantity of at least one metal fluoride sufficient to dispose at least a portion of the metal fluoride into the organic substrate to form an adsorbent precursor; and heating the adsorbent precursor to a temperature of at least about 100° C. or greater to form the adsorbent.

21. The method of claim 20 wherein the method further comprises separating an excess quantity of the at least one metal fluoride from the adsorbent.

22. The method of claim 20 wherein the organic substrate comprises granules.

23. The method of claim 20 wherein the granules have an approximate diameter of 5 mm or less.

24. The method of claim 20 wherein the organic substrate has a pore size of 2 $\mu$m or less.

25. The method of claim 20 wherein the organic substrate comprises a polymer.

26. The adsorbent of claim 25 wherein the polymer comprises polytetrafluoroethylene.

27. The method of claim 20 wherein the metal fluoride is one selected from the group consisting of $CsF$, $CuF_2$, $KPF_6$, $AlF_3$, $CaF_2$, $FeF_2$, $ZrF_2$, $SbF_3$, $LiPF_6$, $NaPF_6$, $K_2NbF_7$, or combinations thereof.

28. The method of claim 20 wherein the organic substrate comprises a solid support.

29. The method of claim 20 wherein the organic substrate comprises beads.

30. The method of claim 20 wherein the organic substrate comprises pellets.

* * * * *

UNITED STATES PATENT AND TRADEMARK OFFICE
CERTIFICATE OF CORRECTION

PATENT NO. : 6,709,487 B1
DATED : March 23, 2004
INVENTOR(S) : Chun Christine Dong et al.

It is certified that error appears in the above-identified patent and that said Letters Patent is hereby corrected as shown below:

Column 10,
Line 15, delete "$F_2$" and substitute therefor -- $F_z$ --

Column 11,
Line 3, delete "20" and substitute therefore -- 22 --

Signed and Sealed this

Twenty-sixth Day of October, 2004

JON W. DUDAS
*Director of the United States Patent and Trademark Office*